United States Patent
Boegel et al.

(10) Patent No.: US 9,707,896 B2
(45) Date of Patent: Jul. 18, 2017

(54) VEHICLE CAMERA LENS DIRT PROTECTION VIA AIR FLOW

(71) Applicant: MAGNA ELECTRONICS, INC., Auburn Hills, MI (US)

(72) Inventors: Ruediger Boegel, Bessenback-Keilberg (DE); Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 199 days.

(21) Appl. No.: 14/052,945

(22) Filed: Oct. 14, 2013

(65) Prior Publication Data

US 2014/0104426 A1   Apr. 17, 2014

Related U.S. Application Data

(60) Provisional application No. 61/804,786, filed on Mar. 25, 2013, provisional application No. 61/713,772, filed on Oct. 15, 2012.

(51) Int. Cl.
| | |
|---|---|
| *B60R 1/10* | (2006.01) |
| *B05B 7/00* | (2006.01) |
| *B60R 1/06* | (2006.01) |
| *B60R 1/00* | (2006.01) |

(Continued)

(52) U.S. Cl.
CPC .................. *B60R 1/10* (2013.01); *B05B 7/00* (2013.01); *B60R 1/00* (2013.01); *B60R 1/006* (2013.01); *B60R 1/06* (2013.01); *B60R 11/04* (2013.01); *B60S 1/0848* (2013.01)

(58) Field of Classification Search
CPC .. B60R 1/00; B60R 1/006; B60R 1/10; B60R 1/06; B60R 11/04; B60R 2300/105; B60R 2300/802; B60S 1/0848; H04N 7/181; B05B 7/08; B05B 1/10
See application file for complete search history.

(56) References Cited

U.S. PATENT DOCUMENTS

| | | | | |
|---|---|---|---|---|
| 1,481,425 | A * | 1/1924 | Kirsch ...................... | F01P 5/02 |
| | | | | 123/41.65 |
| 3,697,157 | A * | 10/1972 | Pizzimenti et al. .......... | 359/509 |
| 5,096,287 | A * | 3/1992 | Kakinami et al. ............ | 352/132 |

(Continued)

FOREIGN PATENT DOCUMENTS

JP   2004182080 A  *  7/2004   ................ B60S 1/60

OTHER PUBLICATIONS

English Machine Translation of JP 2004-182080.*

*Primary Examiner* — Mohammed Jebari
(74) *Attorney, Agent, or Firm* — Gardner, Linn, Burkhart & Flory, LLP

(57) ABSTRACT

A vision system for a vehicle includes a camera having an imager and a lens. The camera is disposed at an exterior portion of a vehicle and has a field of view exterior of the vehicle. An air flow element has an inlet port and an outlet port, with the outlet port configured to direct air flow in front of the lens to direct debris away from the lens. The outlet port is configured to direct air flow at a velocity that is greater than a velocity of air flow that is flowing into the inlet port. The inlet port may have an inlet area that is substantially greater than an outlet area of the outlet port. The system may include an air flow generating device for generating or enhancing air flow through the air flow device.

18 Claims, 16 Drawing Sheets

(51) Int. Cl.
  *B60R 11/04* (2006.01)
  *B60S 1/08* (2006.01)

(56) References Cited

U.S. PATENT DOCUMENTS

| | | | |
|---|---|---|---|
| 5,589,132 A * | 12/1996 | Zippel | F24F 3/12 |
| | | | 250/436 |
| 5,765,116 A | 6/1998 | Wilson-Jones et al. | |
| 5,796,094 A | 8/1998 | Schofield et al. | |
| 5,877,897 A | 3/1999 | Schofield et al. | |
| 5,949,331 A | 9/1999 | Schofield et al. | |
| 6,037,860 A | 3/2000 | Zander et al. | |
| 6,037,975 A | 3/2000 | Aoyama | |
| 6,057,754 A | 5/2000 | Kinoshita et al. | |
| 6,291,906 B1 | 9/2001 | Marcus et al. | |
| 6,292,752 B1 | 9/2001 | Franke et al. | |
| 6,297,781 B1 | 10/2001 | Turnbull et al. | |
| 6,302,545 B1 | 10/2001 | Schofield et al. | |
| 6,310,611 B1 | 10/2001 | Caldwell | |
| 6,311,119 B2 | 10/2001 | Sawamoto et al. | |
| 6,315,421 B1 | 11/2001 | Apfelbeck et al. | |
| 6,317,057 B1 | 11/2001 | Lee | |
| 6,320,282 B1 | 11/2001 | Caldwell | |
| 6,324,450 B1 | 11/2001 | Iwama | |
| 6,333,759 B1 | 12/2001 | Mazzilli | |
| 6,341,523 B2 | 1/2002 | Lynam | |
| 6,353,392 B1 | 3/2002 | Schofield et al. | |
| 6,362,729 B1 | 3/2002 | Hellmann et al. | |
| 6,366,236 B1 | 4/2002 | Farmer et al. | |
| 6,370,329 B1 | 4/2002 | Teuchert | |
| 6,388,565 B1 | 5/2002 | Bernhard et al. | |
| 6,388,580 B1 | 5/2002 | Graham | |
| 6,411,204 B1 | 6/2002 | Bloomfield et al. | |
| 6,411,328 B1 | 6/2002 | Franke et al. | |
| 6,424,273 B1 | 7/2002 | Gutta et al. | |
| 6,429,594 B1 | 8/2002 | Stam et al. | |
| 6,430,303 B1 | 8/2002 | Naoi et al. | |
| 6,433,817 B1 | 8/2002 | Guerra | |
| 6,441,748 B1 | 8/2002 | Takagi et al. | |
| 6,442,465 B2 | 8/2002 | Breed et al. | |
| 6,469,739 B1 | 10/2002 | Bechtel et al. | |
| 6,497,503 B1 | 12/2002 | Dassanayake et al. | |
| 6,516,272 B2 | 2/2003 | Lin | |
| 6,516,664 B2 | 2/2003 | Lynam | |
| 6,523,964 B2 | 2/2003 | Schofield et al. | |
| 6,553,130 B1 | 4/2003 | Lemelson et al. | |
| 6,554,210 B2 * | 4/2003 | Holt et al. | 239/284.2 |
| 6,570,998 B1 | 5/2003 | Ohtsuka et al. | |
| 6,574,033 B1 | 6/2003 | Chui et al. | |
| 6,578,017 B1 | 6/2003 | Ebersole et al. | |
| 6,587,573 B1 | 7/2003 | Stam et al. | |
| 6,589,625 B1 | 7/2003 | Kothari et al. | |
| 6,590,725 B2 * | 7/2003 | Kho | 359/834 |
| 6,593,698 B2 | 7/2003 | Stam et al. | |
| 6,594,583 B2 | 7/2003 | Ogura et al. | |
| 6,650,455 B2 | 11/2003 | Miles | |
| 6,672,731 B2 | 1/2004 | Schnell et al. | |
| 6,674,562 B1 | 1/2004 | Miles | |
| 6,678,056 B2 | 1/2004 | Downs | |
| 6,680,792 B2 | 1/2004 | Miles | |
| 6,681,163 B2 | 1/2004 | Stam et al. | |
| 6,700,605 B1 | 3/2004 | Toyoda et al. | |
| 6,703,925 B2 | 3/2004 | Steffel | |
| 6,710,908 B2 | 3/2004 | Miles et al. | |
| 6,711,474 B1 | 3/2004 | Treyz et al. | |
| 6,714,331 B2 | 3/2004 | Lewis et al. | |
| 6,728,393 B2 | 4/2004 | Stam et al. | |
| 6,728,623 B2 | 4/2004 | Takenaga et al. | |
| 6,735,506 B2 | 5/2004 | Breed et al. | |
| 6,741,377 B2 | 5/2004 | Miles | |
| 6,744,353 B2 | 6/2004 | Sjönell | |
| 6,762,867 B2 | 7/2004 | Lippert et al. | |
| 6,764,210 B2 | 7/2004 | Akiyama | |
| 6,765,480 B2 | 7/2004 | Tseng | |
| 6,784,828 B2 | 8/2004 | Delcheccolo et al. | |
| 6,794,119 B2 | 9/2004 | Miles | |
| 6,795,221 B1 | 9/2004 | Urey | |
| 6,801,127 B2 | 10/2004 | Mizusawa | |
| 6,801,244 B2 | 10/2004 | Takeda et al. | |
| 6,802,617 B2 | 10/2004 | Schofield et al. | |
| 6,807,287 B1 | 10/2004 | Hermans | |
| 6,812,463 B2 | 11/2004 | Okada | |
| 6,823,241 B2 | 11/2004 | Shirato et al. | |
| 6,823,261 B2 | 11/2004 | Sekiguchi | |
| 6,824,281 B2 | 11/2004 | Schofield et al. | |
| 6,838,980 B2 | 1/2005 | Gloger et al. | |
| 6,842,189 B2 | 1/2005 | Park | |
| 6,853,897 B2 | 2/2005 | Stam et al. | |
| 6,859,148 B2 | 2/2005 | Miller et al. | |
| 6,861,809 B2 | 3/2005 | Stam | |
| 6,873,253 B2 | 3/2005 | Veziris | |
| 6,882,287 B2 | 4/2005 | Schofield | |
| 6,888,447 B2 | 5/2005 | Hori et al. | |
| 6,891,563 B2 | 5/2005 | Schofield et al. | |
| 6,898,518 B2 | 5/2005 | Padmanabhan | |
| 6,906,620 B2 | 6/2005 | Nakai et al. | |
| 6,906,639 B2 | 6/2005 | Lemelson et al. | |
| 6,909,753 B2 | 6/2005 | Meehan et al. | |
| 6,914,521 B2 | 7/2005 | Rothkop | |
| 6,932,669 B2 | 8/2005 | Lee et al. | |
| 6,933,837 B2 | 8/2005 | Gunderson et al. | |
| 6,940,423 B2 | 9/2005 | Takagi et al. | |
| 6,944,908 B2 * | 9/2005 | Hoetzer et al. | 15/316.1 |
| 6,946,978 B2 | 9/2005 | Schofield | |
| 6,950,035 B2 | 9/2005 | Tanaka et al. | |
| 6,953,253 B2 | 10/2005 | Schofield et al. | |
| 6,959,994 B2 | 11/2005 | Fujikawa et al. | |
| 6,961,178 B2 | 11/2005 | Sugino et al. | |
| 6,967,569 B2 | 11/2005 | Weber et al. | |
| 6,968,736 B2 | 11/2005 | Lynam | |
| 6,975,775 B2 | 12/2005 | Rykowski et al. | |
| 6,989,736 B2 | 1/2006 | Berberich et al. | |
| 7,004,606 B2 | 2/2006 | Schofield | |
| 7,023,331 B2 | 4/2006 | Kodama | |
| 7,030,738 B2 | 4/2006 | Ishii | |
| 7,030,775 B2 | 4/2006 | Sekiguchi | |
| 7,038,577 B2 | 5/2006 | Pawlicki et al. | |
| 7,057,505 B2 | 6/2006 | Iwamoto | |
| 7,057,681 B2 | 6/2006 | Hinata et al. | |
| 7,062,300 B1 | 6/2006 | Kim | |
| 7,065,432 B2 | 6/2006 | Moisel et al. | |
| 7,068,289 B2 | 6/2006 | Satoh et al. | |
| 7,085,633 B2 | 8/2006 | Nishira et al. | |
| 7,085,637 B2 | 8/2006 | Breed et al. | |
| 7,092,548 B2 | 8/2006 | Laumeyer et al. | |
| 7,095,432 B2 | 8/2006 | Nakayama et al. | |
| 7,106,213 B2 | 9/2006 | White | |
| 7,110,021 B2 | 9/2006 | Nobori et al. | |
| 7,116,246 B2 | 10/2006 | Winter et al. | |
| 7,121,028 B2 | 10/2006 | Shoen et al. | |
| 7,123,168 B2 | 10/2006 | Schofield | |
| 7,133,661 B2 | 11/2006 | Hatae et al. | |
| 7,149,613 B2 | 12/2006 | Stam et al. | |
| 7,151,996 B2 | 12/2006 | Stein | |
| 7,187,498 B2 | 3/2007 | Bengoechea et al. | |
| 7,195,381 B2 | 3/2007 | Lynam et al. | |
| 7,196,305 B2 | 3/2007 | Shaffer et al. | |
| 7,205,904 B2 | 4/2007 | Schofield | |
| 7,227,459 B2 | 6/2007 | Bos et al. | |
| 7,227,611 B2 | 6/2007 | Hull et al. | |
| 7,235,918 B2 | 6/2007 | McCullough et al. | |
| 7,248,283 B2 | 7/2007 | Takagi et al. | |
| 7,271,951 B2 | 9/2007 | Weber et al. | |
| 7,304,661 B2 | 12/2007 | Ishikura | |
| 7,311,405 B2 * | 12/2007 | Irvin | 359/507 |
| 7,311,406 B2 | 12/2007 | Schofield et al. | |
| 7,325,934 B2 | 2/2008 | Schofield et al. | |
| 7,325,935 B2 | 2/2008 | Schofield et al. | |
| 7,337,055 B2 | 2/2008 | Matsumoto et al. | |
| 7,338,177 B2 | 3/2008 | Lynam | |
| 7,355,524 B2 | 4/2008 | Schofield | |
| 7,375,803 B1 | 5/2008 | Bamji | |
| 7,380,948 B2 | 6/2008 | Schofield et al. | |
| 7,388,182 B2 | 6/2008 | Schofield et al. | |

(56) References Cited

U.S. PATENT DOCUMENTS

| | | |
|---|---|---|
| 7,420,756 B2 | 9/2008 | Lynam |
| 7,423,821 B2 | 9/2008 | Bechtel et al. |
| 7,429,998 B2 | 9/2008 | Kawauchi et al. |
| 7,432,967 B2 | 10/2008 | Bechtel et al. |
| 7,446,924 B2 | 11/2008 | Schofield et al. |
| 7,460,007 B2 | 12/2008 | Schofield et al. |
| 7,474,963 B2 | 1/2009 | Taylor et al. |
| 7,489,374 B2 | 2/2009 | Utsumi et al. |
| 7,495,719 B2 | 2/2009 | Adachi et al. |
| 7,525,604 B2 | 4/2009 | Xue |
| 7,526,103 B2 | 4/2009 | Schofield et al. |
| 7,541,743 B2 | 6/2009 | Salmeen et al. |
| 7,543,946 B2 | 6/2009 | Ockerse et al. |
| 7,545,429 B2 | 6/2009 | Travis |
| 7,548,291 B2 | 6/2009 | Lee et al. |
| 7,551,103 B2 | 6/2009 | Schofield |
| 7,561,181 B2 | 7/2009 | Schofield et al. |
| 7,565,006 B2 | 7/2009 | Stam et al. |
| 7,567,291 B2 | 7/2009 | Bechtel et al. |
| 7,605,856 B2 | 10/2009 | Imoto |
| 7,609,857 B2 | 10/2009 | Franz |
| 7,613,327 B2 | 11/2009 | Stam et al. |
| 7,616,781 B2 | 11/2009 | Schofield et al. |
| 7,619,508 B2 | 11/2009 | Lynam et al. |
| 7,629,996 B2 | 12/2009 | Rademacher et al. |
| 7,639,149 B2 | 12/2009 | Katoh |
| 7,653,215 B2 | 1/2010 | Stam |
| 7,663,798 B2 | 2/2010 | Tonar et al. |
| 7,676,087 B2 | 3/2010 | Dhua et al. |
| 7,720,580 B2 | 5/2010 | Higgins-Luthman |
| 7,724,434 B2 | 5/2010 | Cross et al. |
| 7,731,403 B2 | 6/2010 | Lynam et al. |
| 7,742,864 B2 | 6/2010 | Sekiguchi |
| 7,791,694 B2 | 9/2010 | Molsen et al. |
| 7,792,329 B2 | 9/2010 | Schofield et al. |
| 7,842,154 B2 | 11/2010 | Lynam |
| 7,843,451 B2 | 11/2010 | Lafon |
| 7,854,514 B2 | 12/2010 | Conner et al. |
| 7,855,778 B2 | 12/2010 | Yung et al. |
| 7,881,496 B2 | 2/2011 | Camilleri |
| 7,903,324 B2 | 3/2011 | Kobayashi et al. |
| 7,903,335 B2 | 3/2011 | Nieuwkerk et al. |
| 7,914,187 B2 | 3/2011 | Higgins-Luthman et al. |
| 7,930,160 B1 | 4/2011 | Hosagrahara et al. |
| 7,949,152 B2 | 5/2011 | Schofield et al. |
| 7,965,336 B2 | 6/2011 | Bingle et al. |
| 7,965,357 B2 | 6/2011 | Van De Witte et al. |
| 8,017,898 B2 | 9/2011 | Lu et al. |
| 8,027,691 B2 | 9/2011 | Bernas et al. |
| 8,090,153 B2 | 1/2012 | Schofield et al. |
| 8,095,310 B2 | 1/2012 | Taylor et al. |
| 8,098,142 B2 | 1/2012 | Schofield et al. |
| 8,120,652 B2 | 2/2012 | Bechtel et al. |
| 8,184,159 B2 | 5/2012 | Luo |
| 8,224,031 B2 | 7/2012 | Saito |
| 8,233,045 B2 | 7/2012 | Luo et al. |
| 8,289,430 B2 | 10/2012 | Bechtel et al. |
| 8,305,471 B2 | 11/2012 | Bechtel et al. |
| 8,308,325 B2 | 11/2012 | Takayanazi et al. |
| 8,314,689 B2 | 11/2012 | Schofield et al. |
| 8,339,526 B2 | 12/2012 | Minikey, Jr. et al. |
| 2007/0182528 A1 | 8/2007 | Breed et al. |
| 2009/0250533 A1* | 10/2009 | Akiyama et al. ............ 239/284.1 |
| 2009/0295181 A1* | 12/2009 | Lawlor ................... B60R 1/12 296/1.11 |
| 2011/0073142 A1* | 3/2011 | Hattori et al. ............. 134/56 R |
| 2011/0266375 A1* | 11/2011 | Ono et al. ................... 239/589 |
| 2012/0070142 A1* | 3/2012 | Tregnago ............ B60R 1/0605 396/419 |
| 2013/0092758 A1* | 4/2013 | Tanaka .................... B60S 1/56 239/284.1 |
| 2013/0094086 A1* | 4/2013 | Bochenek ................... 359/509 |
| 2013/0219742 A1* | 8/2013 | Field et al. .................. 34/491 |
| 2013/0300869 A1 | 11/2013 | Lu et al. |
| 2014/0104426 A1 | 4/2014 | Boegel et al. |
| 2014/0232869 A1 | 8/2014 | May et al. |

* cited by examiner

VEHICLE CAMERA LENS DIRT PROTECTION VIA AIR FLOW

CROSS REFERENCE TO RELATED APPLICATIONS

The present application claims the filing benefits of U.S. provisional applications, Ser. No. 61/804,786, filed Mar. 25, 2013, and Ser. No. 61/713,772, filed Oct. 15, 2012, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that may be displayed or processed to provide the desired display images and/or processing and control, depending an the particular application of the camera and vision or imaging system. The present invention provides a camera module for use in a vehicle vision system, and the camera module includes an additional structure to guide an airflow over the camera front area to hold off rain, hail, snow and dust from the cameras front lens surface while the vehicle is in motion.

These and other objects, advantages, purposes and features of the present invention will become apparent upon review of the following specification in conjunction with the drawings.

Figure 1:
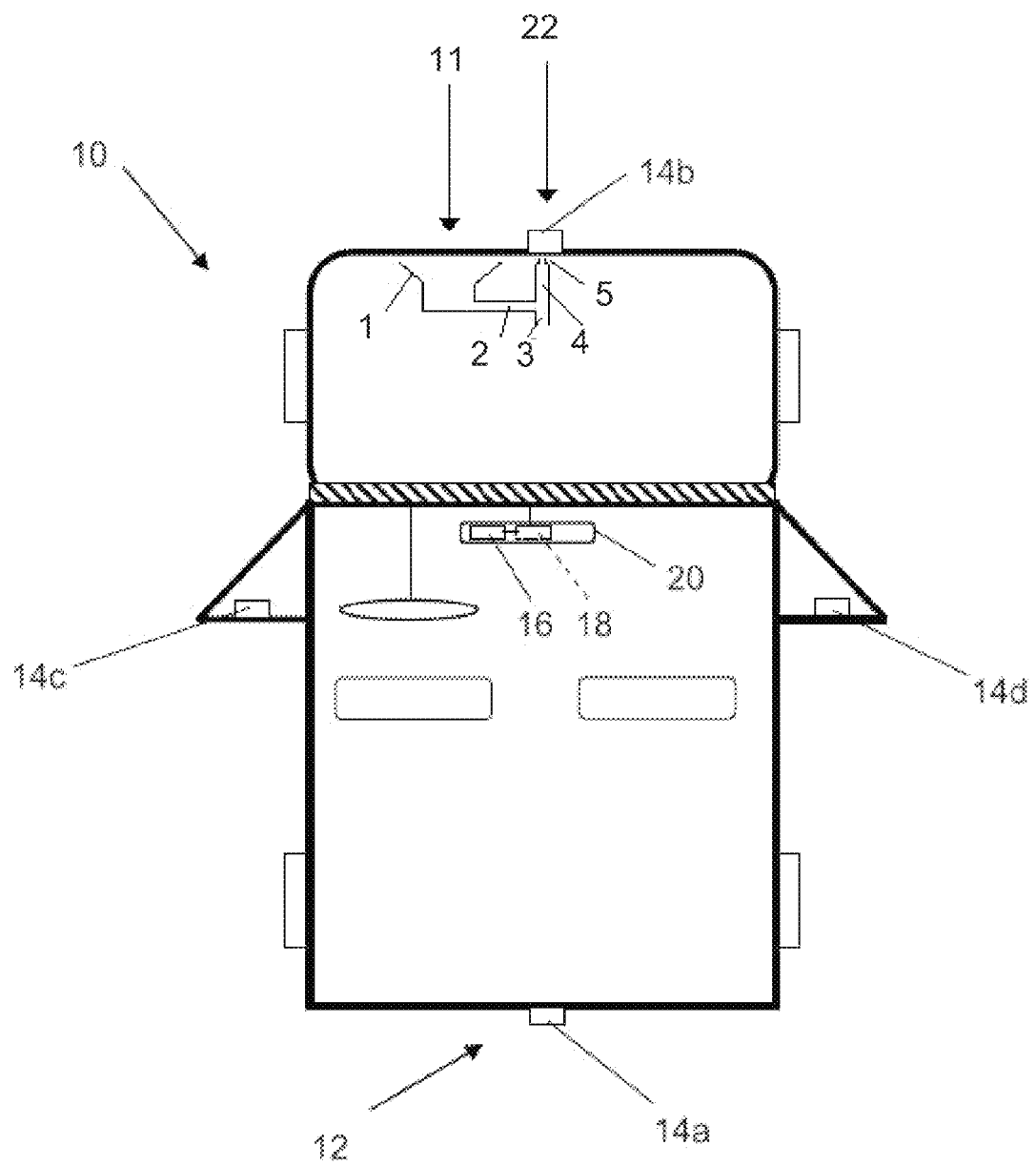
FIG. 1 is a plan view of a vehicle with a vision system and imaging sensors or cameras that provide exterior fields of view and the air guidance means to provide an air flow over the outside lens of the camera in accordance with the present invention.

Figures Legend:
(1) Air funnel
(2) Dry chamber
(3) Water outlet
(4) Dry air outlet
(5) Air nozzle
(6) Water baffles
(7) Electric fan/Compressor
(8) Rain drops (with falling path as a tail)
(9) Deflected rain drops
(10) Vehicle
(11) Air steam intake
(13) Air bypass
(14b) Vehicle camera
(16) Display device
(18) Control or image processor
(20) Rearview mirror assembly

(21) Camera lens surface
(22) Air stream from nozzle
(23) Effective Air deflection area
(24) Ultra sound generator
(25) Area of active ultrasound
(26) Diffused water drops
(27) Heated air area
(28) Hot exhaust area
(29) Exhaust
(30) Air filter
(31) Engine radiator
(32) Air outlet angle
(33) Electrical heating element
(40) Air pump and distributor
(41) Pneumatic line/hose
(42) Control device
(43) Signal line

DESCRIPTION OF THE PREFERRED EMBODIMENTS

Vehicle vision system and driver assistant system sensors can only work properly when their field of view is not restricted by obstacles or debris, such as snow or the like, or such as when blurred such as by water drops or the like, when such are resting on the sensor's surface. Especially optical systems diminish in function when their vision is blurred by such debris or the like.

There are three ways to cope with such obstructions. For example, the camera may have a type of cleaning device that cleans the camera lens surface by spraying a washing substance over the dirty surface of the lens, such as in a similar manner as described in JP002011245989A, or by wiping a lens surface or cover, such as in a similar manner as described in U.S. Pat. No. 7,965,336, which is hereby incorporated herein by reference in its entirety, or by trying to hinder water drops and dirt from forming at the lens surface. When the car is not moving, this may be done by casing the camera in a housing or applying a lid or cover or the like.

The present invention applies an air stream curtain close to the camera's front end (the portion that is exposed at the exterior of the vehicle, which may be facing in the forward direction of travel of the vehicle for a forward or front camera or in a sideward and/or rearward direction of travel of the vehicle for a side or rear camera) in a way that it acts like a deflector to impacting water drops, hail, snow flakes and particles and/or the like.

This may be achieved by an additional structure comprising an air intake area for collecting an air stream which is substantially directed to a nozzle at the outside area of the camera at an angle suitable to deflect raindrops, hail and snow redirected away from the cameras lens surface, and such as toward the underside of the camera or underneath the camera. It is preferred that the airstream speed at the nozzle outlet of the system of the present invention is always substantially higher than the driving air speed caused by the vehicle's own velocity when the vehicle is being driven. The air steam may be generated in that manner by a passive member or device which comprises an air funnel substantially directed into the main driving direction of the vehicle or by an active member which comprises an electric motor driven air fan or the like.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front of the vehicle, and/or a sidewardly and/or rearwardly facing camera 14c, 14b at the sides of the vehicle), which capture images exterior of the vehicle, with the cameras having a lens for focusing Images at or onto an imaging array or imaging plane of the camera (FIG. 1). The vision system 12 is operable to process image data captured by the cameras and may provide displayed images at a display device 16 (such as at an interior rearview mirror assembly 20 of the vehicle or elsewhere in the interior cabin of the vehicle) for viewing by the driver of the vehicle. Optionally, the vision system may process image data to detect objects (such as via a control or image processor 18), such as objects to the rear of the subject or equipped vehicle during a reversing maneuver, or such as approaching or following vehicles or vehicles at a side lane adjacent to the subject or equipped vehicle or the like.

Figure 2:
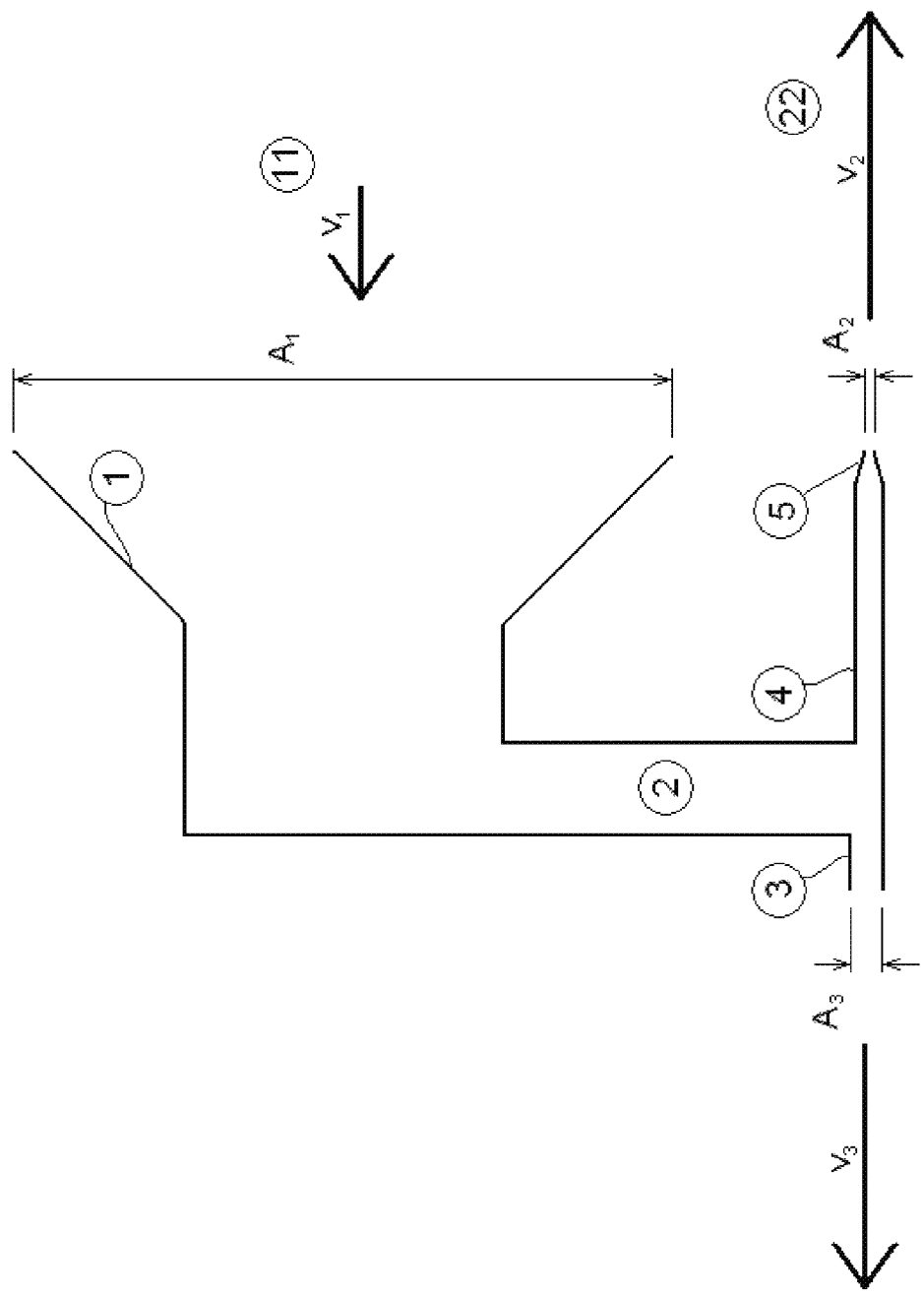
FIG. 2 is a schematic of the basic principle of the invention, shown with the air stream generated as passive.
Figure 3:
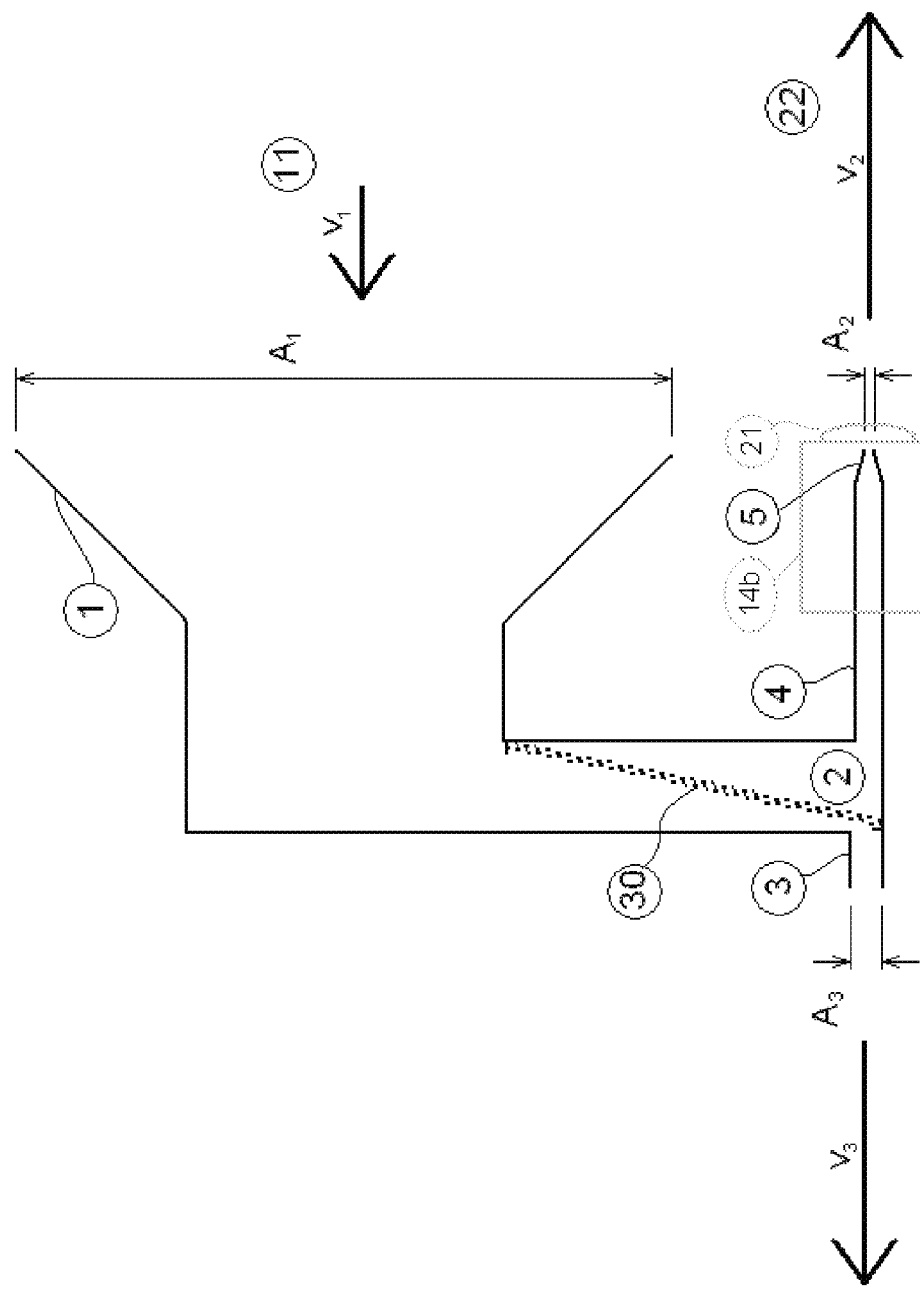
FIG. 3 is another schematic of a principle of the invention showing optional means for filtering the incoming air from particles and a vehicle camera relative to the air funnel outlet.
Figure 4:
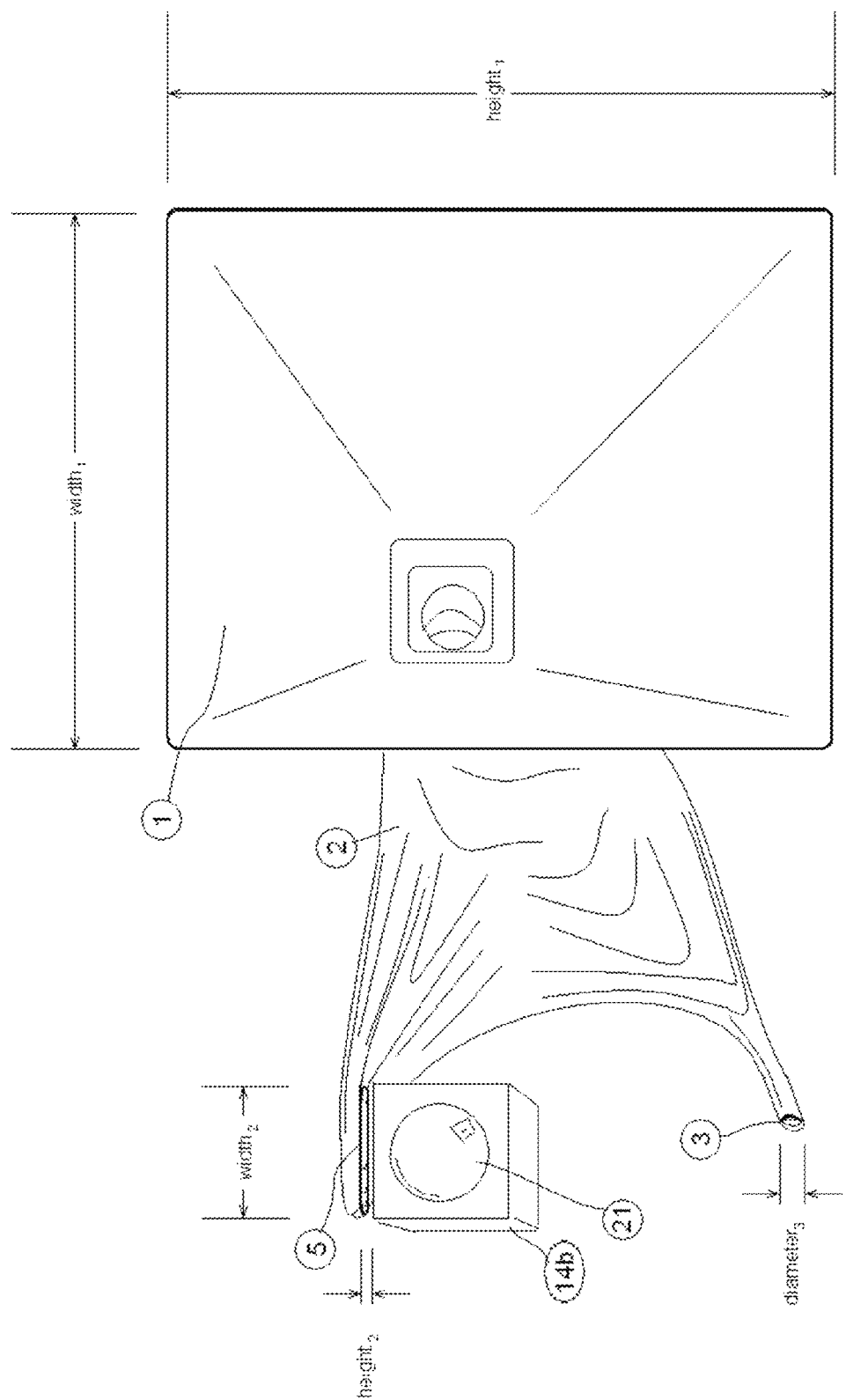
FIG. 4 is an exemplary image showing how a passive solution according to the invention may look like in a front view, with the difference in the dimensions of the intake and the outlets being illustrated.

FIG. 2 is a schematic of the basic principle of the present invention. In the illustrated embodiment of FIG. 2, the air stream is generated passive. The relation of the air streams $A1 \times v1 - A3 \times v3 = K \times A2 \times v2$ is illustrated in FIG. 2. FIG. 3 is another schematic of the principle of the invention showing optional means (such as a filter or filter means 30 disposed in the system) for filtering the incoming air from particles and a vehicle camera 14b relative to the air funnel outlet 5. FIG. 4 is a perspective view showing the relative locations and dimensions of the air flow intake and discharge or outlet ports. It becomes obvious that A1 is much larger than A3 and A2 which ensures a substantial airflow through the output nozzles 3 and 5.

$$A_1 >> A_3 + A_2$$

When comprising a preferred passive system (and with reference to FIGS. 1-4), the air flow 2 with the wind speed v2 through a nozzle hole in the extension A2 should equal to the air flow 1 captured by a funnel in the size of A2 with essential the wind speed caused by the vehicle's own velocity plus/minus whether dependent additional outside wind speed v1

$$A_1 \times v_1 = A_2 \times v_2$$

With a non-ideal system there is an additional nonlinear air friction 'K' on the surfaces of the funnel, hoses and nozzle which diminishes the effectively.

$$A_1 \times v_1 = K \times A_2 \times v_2$$

An additional option of the invention is to dry the air within a drying chamber after the air is collected or captured by the intake. The water becomes separated from the air and drained through a water outlet at the bottom. To make sure that the water can escape fast enough, a part of the ram pressure may be used to accelerate the water draining (speed $v_3$; output area $A_3$). This diminishes the air stream nozzle output by another part:

$$A_1 \times v_1 - A_3 \times v_3 = K \times A_2 \times v_2$$

An additional option of the present invention is to use an air filter within the air stream to filter the incoming air from polluting particles that these can't pollute the nozzle outlet.

Figure 5:
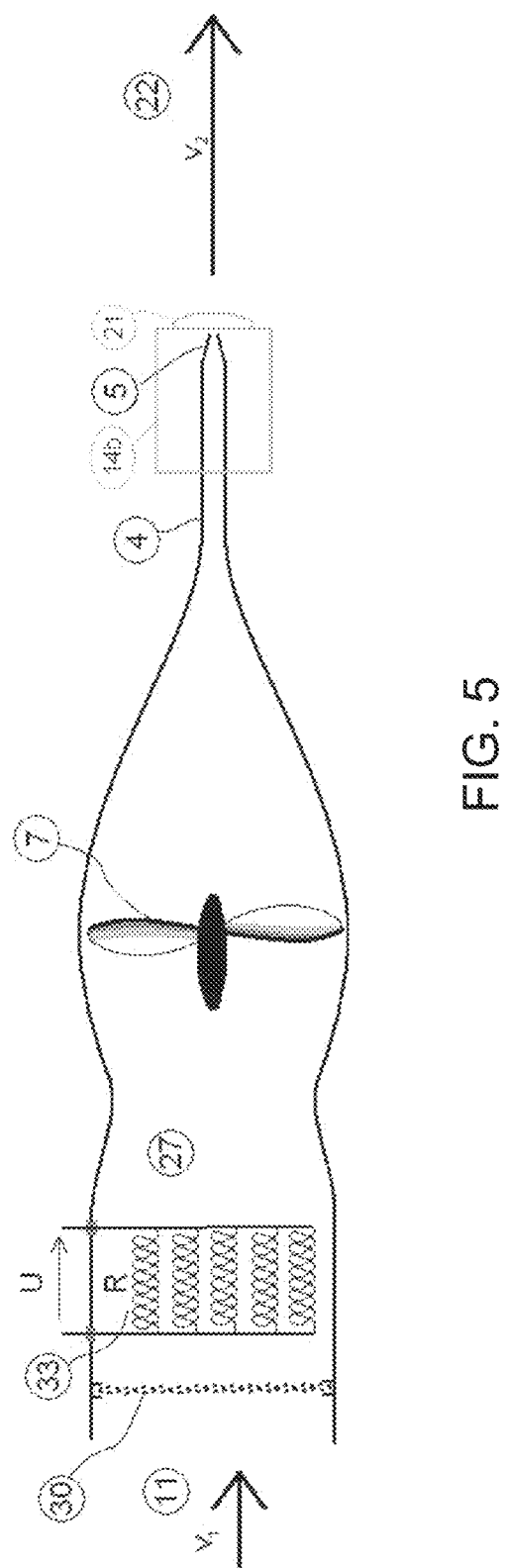
FIG. 5 shows another schematic of a principle of the invention, shown with the air stream being actively generated by an electric fan, and shown with optional means for filtering the incoming air from particles, means for heating up the air electrically and a vehicle camera relative to the air funnel outlet.
Figure 6:
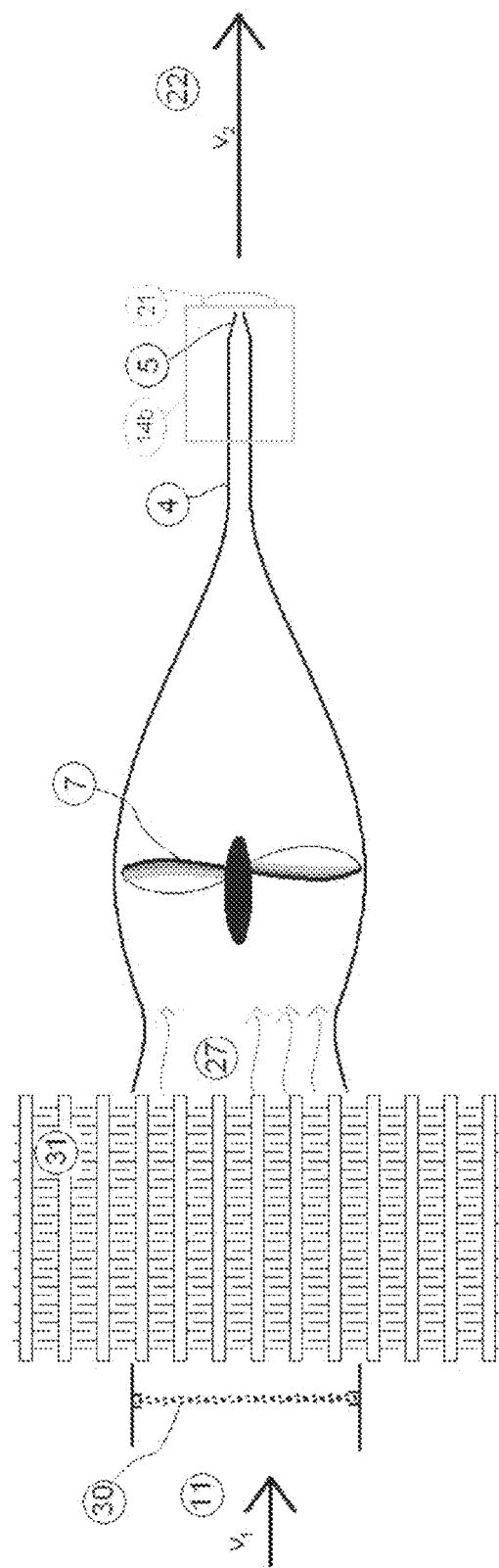
FIG. 6 shows another schematic of a principle of the invention, shown with the air stream actively generated by an electric fan, and shown with optional means for filtering the incoming air from particles, means for heating up the air by the engine coolant when the air is guided through the engine's radiator and a vehicle camera relative to the air funnel outlet.
Figure 7:
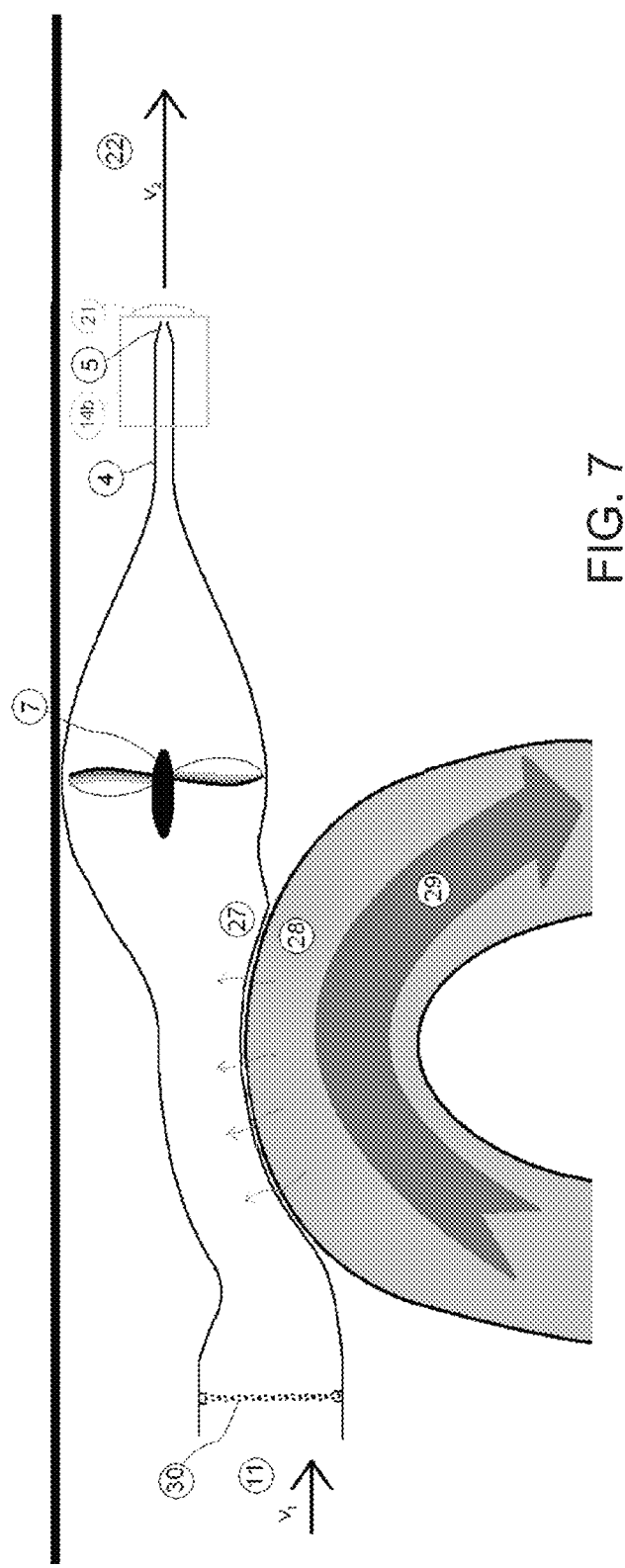
FIG. 7 shows another schematic of a principle of the invention, shown with the air stream actively generated by an electric fan, and shown with optional means for filtering the incoming air from particles, means for heating up the air which are comprised by a compartment the air is guided through which is heated up by the engine's exhaust gases and a vehicle camera relative to the air funnel outlet.

Optionally, the air becomes heated up by any means as like passing or driving by an electrical heater element 33 (FIG. 5), such as the engine's or electrical motor's cooling radiator 31 (FIG. 6), a heat exchange area 27 heated from the engine's exhaust gases 29 (FIG. 7) or the a heat exchange area 27 heated from engine's oil or the like. Beside holding off new particles, raindrops, hail and snow flakes, the heated air may help to melt snow and ice at the lens or camera, so that these can fall off the camera. The system may comprise but should not be limited to have additional cleaning abilities. It may be able to draw away dust, snow and rain drops from the lens surface by the air stream from the nozzle.

Figure 8:
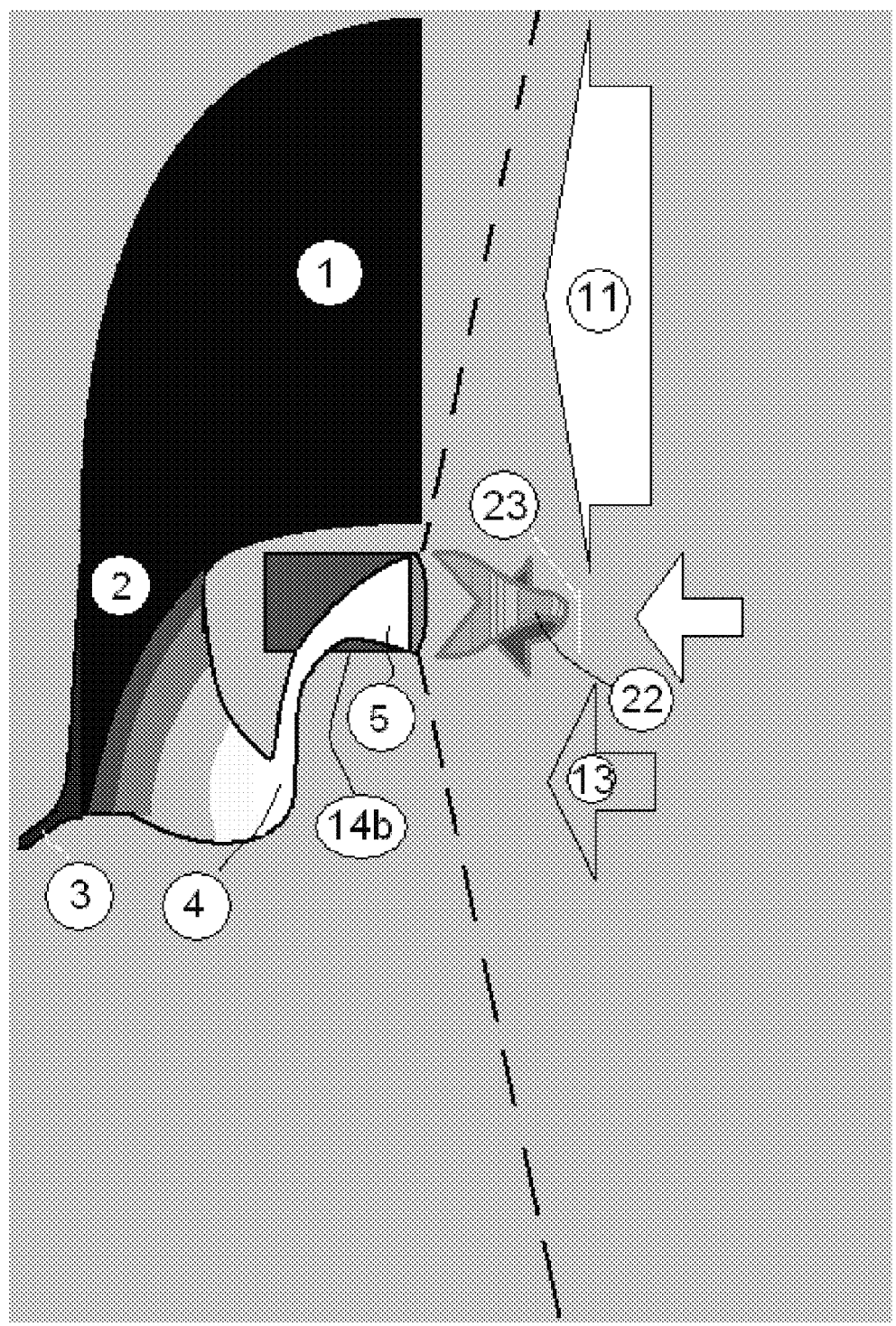
FIG. 8 shows a schematic top view of a passive implementation of the system of the present invention, shown with the funnel's width covering the extension of the camera lens by a dry air stream which works against the air flow caused by the relative velocity of the vehicle, wherein the deflective air extension area ends at the distance where the outlets airs kinetic energy component in driving direction is exhausted by the impacting outside air, and due to the vertical component the air stream than dives underneath the camera.
Figure 9:
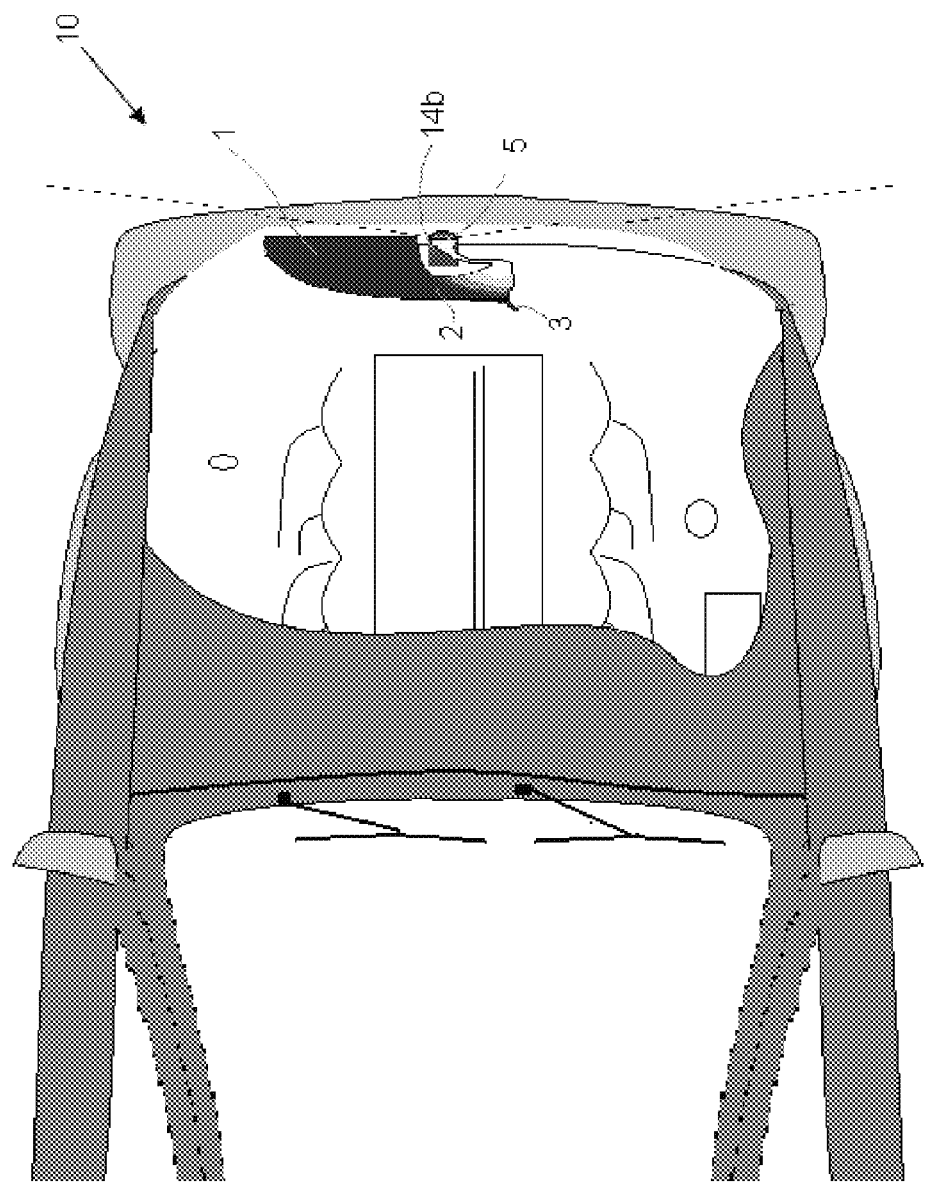
FIG. 9 shows an exemplary installing position into a car of a passive implementation of the system of the present invention, such as shown in FIG. 7, shown with a front grill wide angle vision system camera.

As can be seen with reference to FIGS. 4, 8 and 9, the air flow device has a larger inlet port or opening 1 that collects air flow (such as at a forward portion of a vehicle and such as when the vehicle is traveling in a forward direction) and funnels the air flow into a smaller channel so as to discharge the air as a higher velocity air stream at or near the camera or lens. As shown in FIG. 4, the outlet nozzle 5 may be sized and shaped to be at a side (such as an upper side or region) of the sensor (such as a camera and lens sensor or other suitable sensor) and may direct the discharged air flow in front of the sensor to limit particles from impacting the sensor or lens as the vehicle travels forwardly (and optionally with use of a fan or the like to generate air flow if the vehicle is stopped, as discussed below). In the illustrated embodiment, the discharge nozzle comprises a narrow port across an upper side or region of the sensor and is directed forwardly of the sensor and downwardly so that air that is discharged from the discharge nozzle flows in front of the sensor and across the sensor and may flow back and below the sensor (due to the air flow towards the vehicle due to the vehicle's forward speed of travel), such that any particles flying into the air flow or stream will be directed away from the sensor.

An optional implementation, the inventive system may comprise an active member (either alone or in combination with the system above). For example, and with reference to FIGS. 5-7 and 15, the system may include an electric fan or compressor 7 installed in the air guiding structure to either support the passively generated air stream as described above or to propel the air stream alone without the use of passive elements. This realization also works (to keep the camera lens clean) at no or low speed so as to reduce or eliminate the need for cameras that possess a lid covers or housings. Optionally, when the vehicle is traveling at higher speeds (such as at a speed above a threshold level), no compressor or fan may be used and the passive airflow system above may be used, with flow distribution controlled by the distributor or the like for one or more or all of the cameras at the vehicle.

Figure 15:
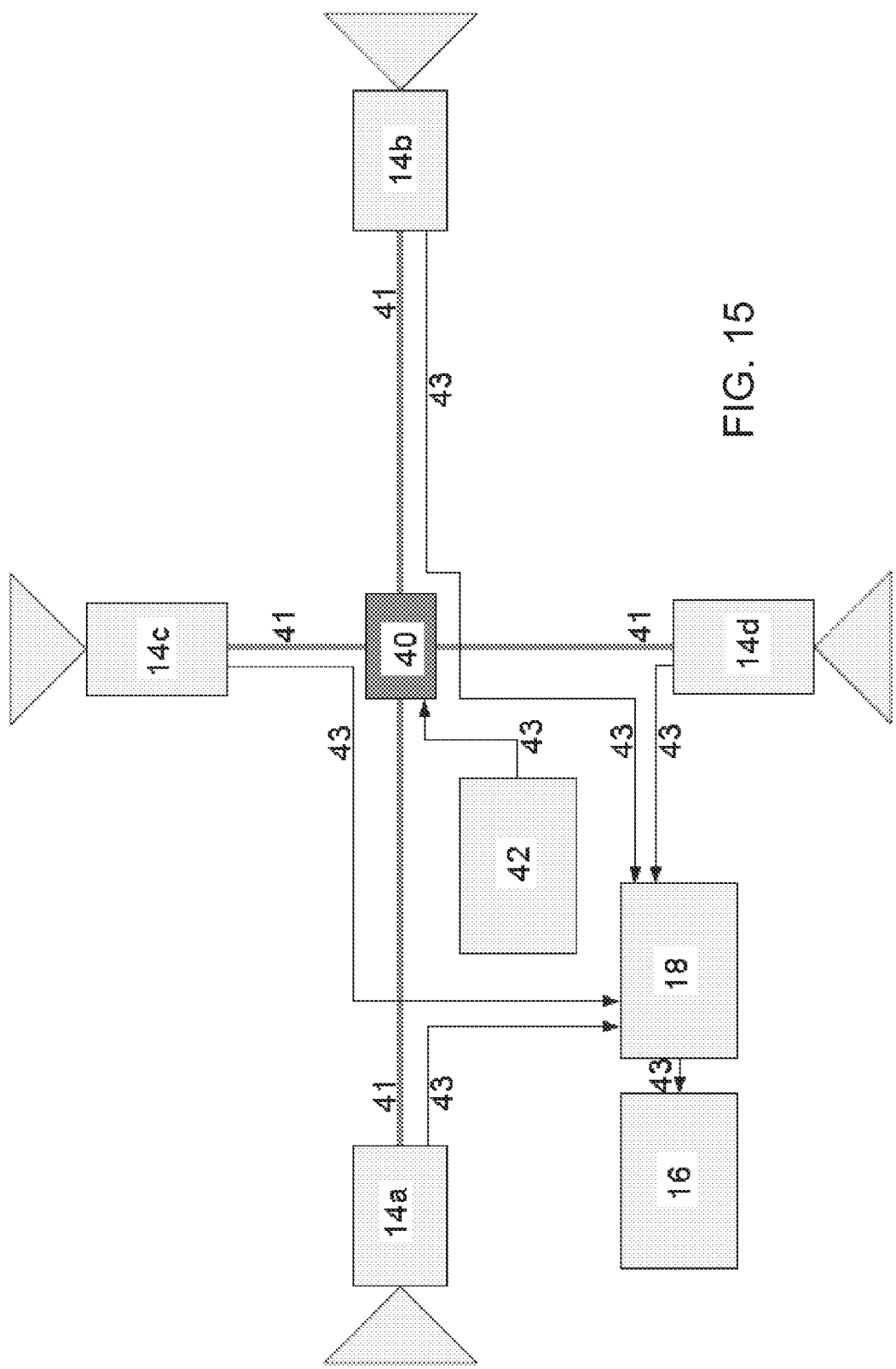
FIG. 15 is a schematic of a four camera vehicle vision system having a central air compressor device and pneumatic lines leading to each camera for providing air for cleaning the respective camera.

When using a compressor, the compressor 40 may be installed centrally (such as shown in FIG. 15), or optionally an air compressor may be used in combination with a compressed air storage device, or alternatively a compressed air storage device may be attached and used as a pressure source. Pneumatic hoses 41 may distribute compressed air from the air compressor 40 or compressed air storage device to the camera air cleaning outlets at the respective cameras 14a-d of the vehicle. The hoses may be routed directly to the cameras (such as shown in FIG. 15) or more than one camera may be provided with or cleaned by one common air hose coming from the air supply. Optionally, the air pressure source may comprise a common vehicle air compressor already in use at the vehicle, such as for supplying pressurized air for a suspension system, or for engine charging, break actuating, lock actuating and/or the like.

Optionally, the system may, such as responsive to image processing of image data captured by the cameras, determine the level of dirt at each camera (as well as weather conditions and/or the like) and may dynamically control the air pressure to the individual cameras. For example, image data captured by the cameras 14a-d may be communicated to a control or ECU 18 via signal lines or links 43 (such as wired or wireless communication links between the cameras and the control) and processed by the control or ECU 18 to determine the level of dirt at the cameras. Optionally, images representative of the captured image data may be communicated by the control 18 to a display 16 for viewing by the driver or other occupant of the vehicle. Optionally, the driver may actuate a user input to actuate the compressor to remove dirt from the lenses of the cameras, such as responsive to the driver viewing the displayed images and seeing that contaminants are present on one or more of the camera lenses.

Optionally, the system may, such as by utilizing the same pipe lines or hoses, discharge a cleaning fluid or liquid at the start of the cleaning process, and then follow that with pressurized air flow to enhance the lens/camera cleaning process. Optionally, during rain or wet road conditions, the system may control the air pressure and distribute the pressurized air using a central ECU 18 to keep the cameras clean to improve or enhance camera vision. Optionally, an application specific control device 42 may be operable to control operation of the compressor (such as in response to a user input or to the control 18), or the control aspects of control device 42 may be incorporated into the control 18. Optionally, the system of the present invention may be compact and may run air lines to the cameras from a single central distributor and small air compressor, which may be controlled by a vehicle ECU or the like. Thus, the system of the present invention may, such as before the driver has started driving the vehicle, clean all of the cameras so that they are clean and ready for image data capture prior to or at the onset of vehicle movement. Also, the system of the present invention may have a single motor or compressor (and thus may save costs) and a distributor, whereby the system may control the pressure at different cameras and thus may provide different levels of cleaning at the different cameras.

The illustrated embodiments of FIGS. 1-14 mostly relate to front cameras but the invention is not limited to front camera applications. For example, side and rear cameras may be equipped with an air flow device of the present invention, such as devices similar to those described above and shown in the attached figures.

Figure 10:
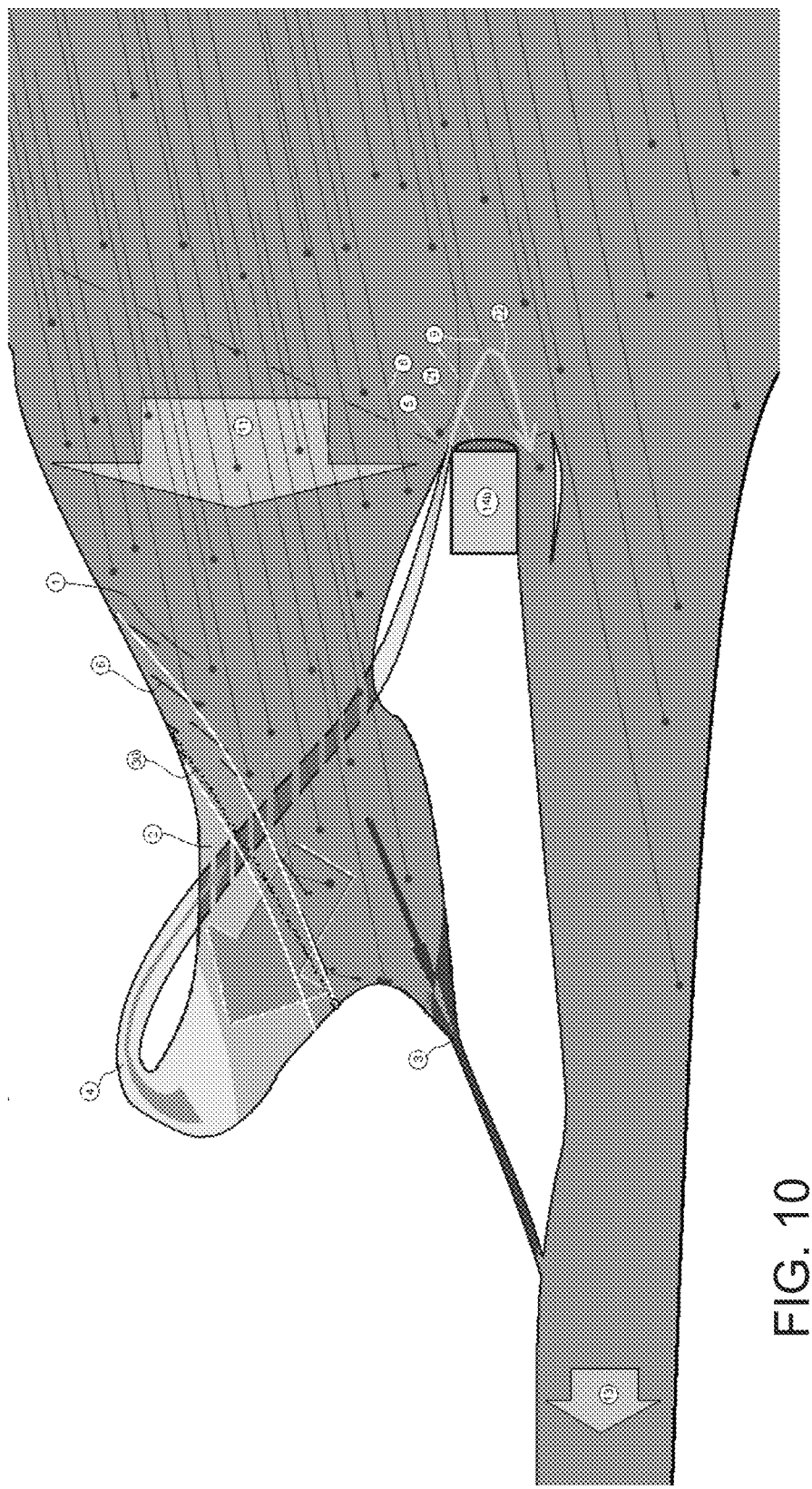
FIG. 10 shows a schematic side view of a passive implementation of the system of the present invention.
Figure 11:
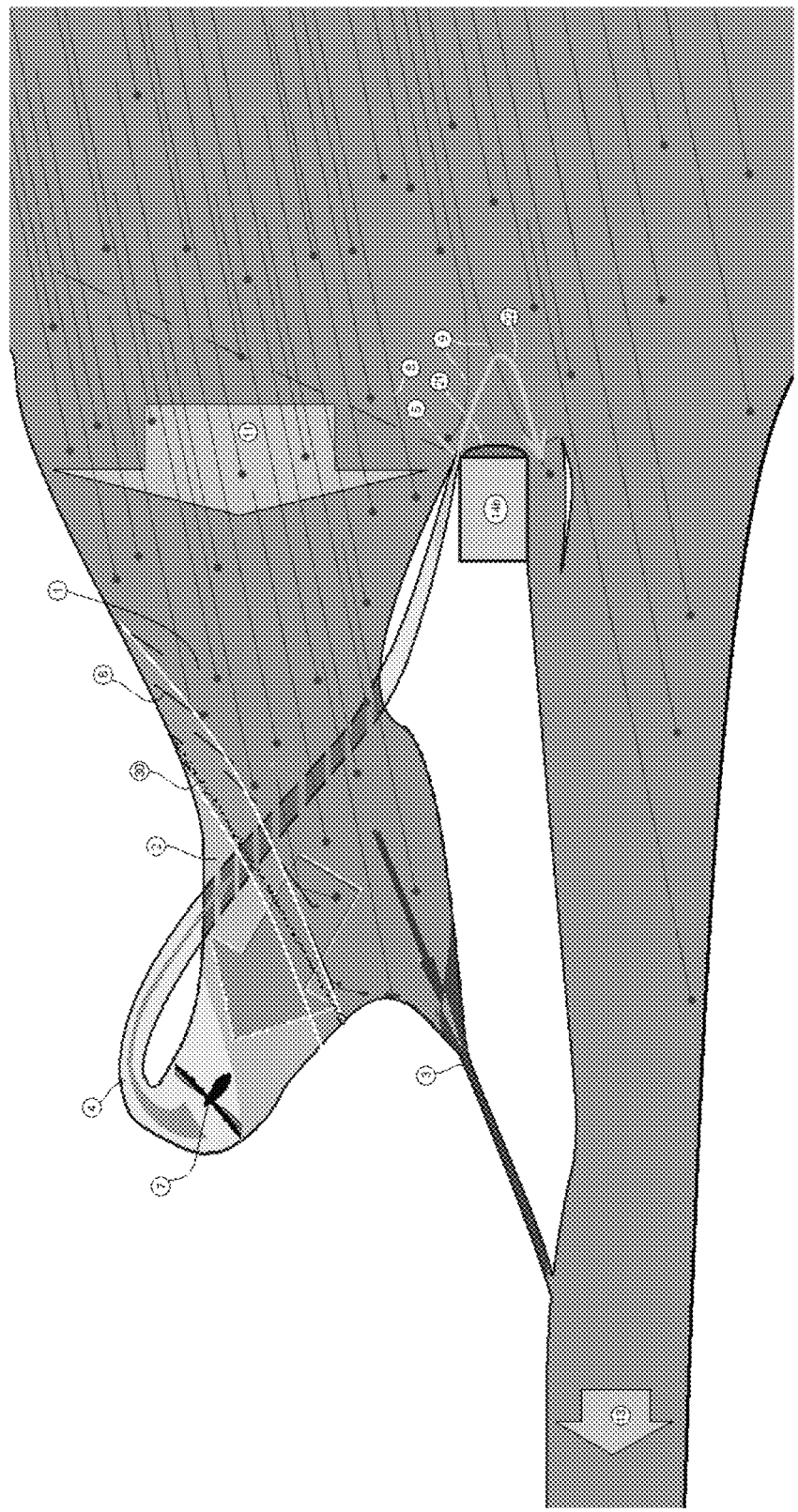
FIG. 11 shows a schematic side view of an active implementation of the system of the present invention, shown with the same working principle as that shown in FIG. 10, but with an electric air fan added for increasing the air sped of the deflective air stream.
Figure 11A:
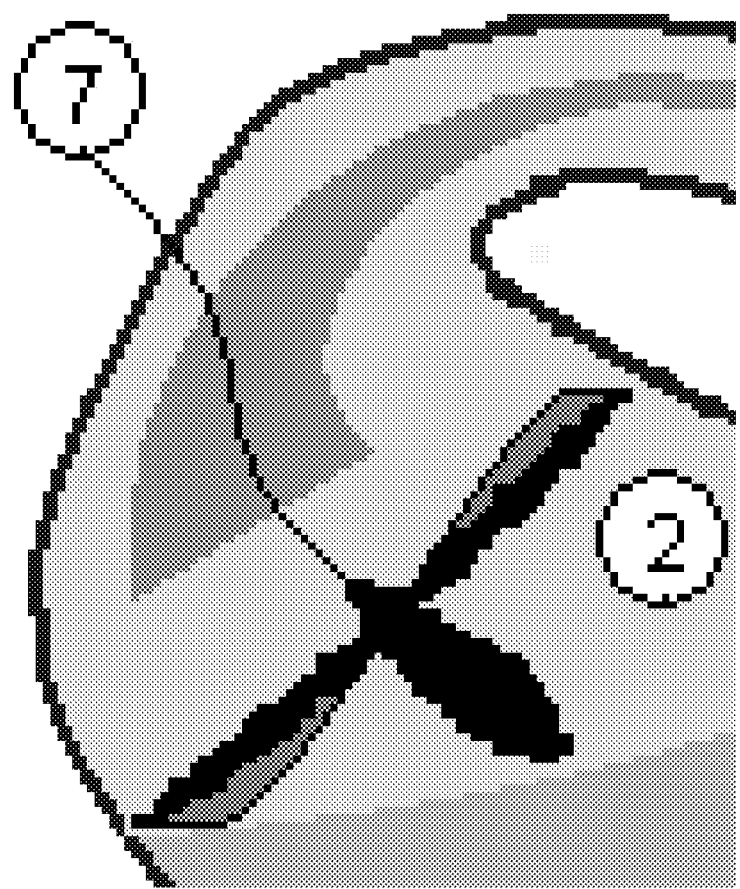
FIG. 11A shows a close up view of the electric fan of FIG. 11 as installed in the region of the dry air outlet.

FIG. 10 shows a schematic side view of a passive implementation of the system of the present invention. The funnel releases a dry air stream (22) which works against the air flow caused by the relative velocity of the vehicle. The rain drop deflective working principle is shown. No rain drops attain to the camera's lens surface. As shown is how the water becomes separated so that dry air enters the dry chamber (2) while the water is released into the water outlet (3). Water baffles (6) at or in front of the dry chamber separate direct impacting raindrops. An air filter (30) hinders small particles from intaking and adding up in the air funnel. The bypass air flow (13) increases the release of water out of the water outlet and driving away the deflected air.

Figure 12:
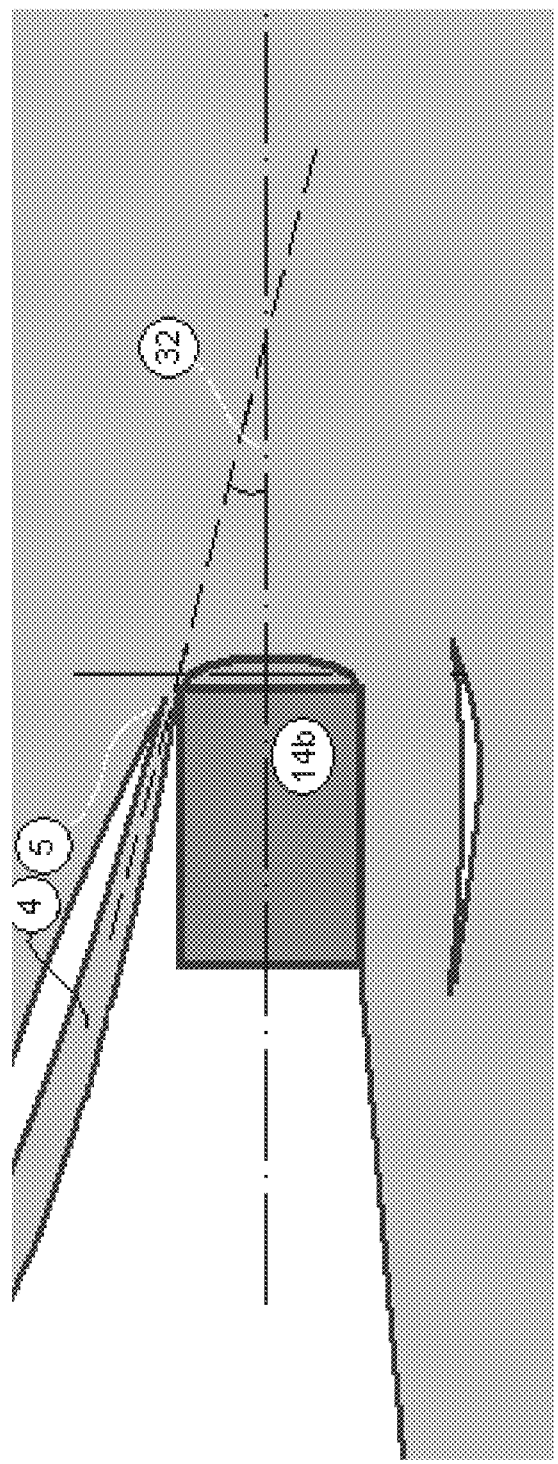
FIG. 12 shows a side view cut out region from FIG. 10 or FIG. 11, with the area around the camera being shown.
Figure 13:
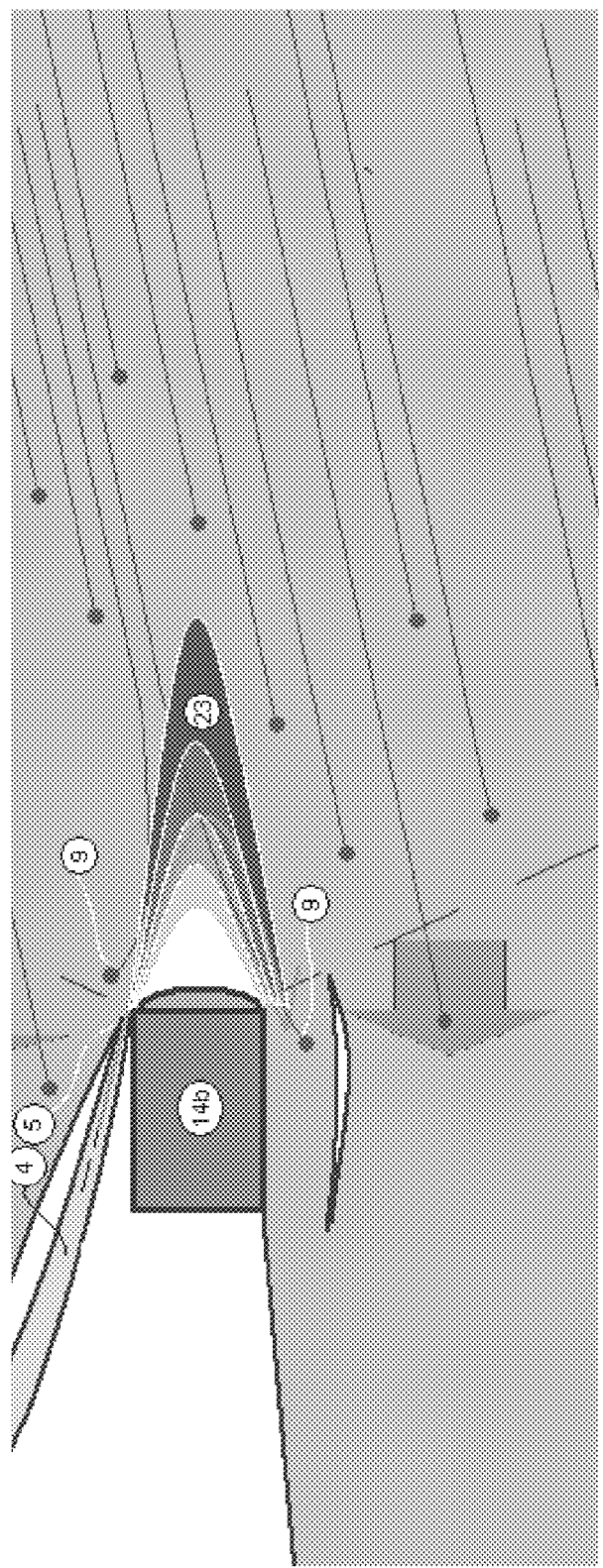
FIG. 13 is a schematic of the air flow released from the nozzle impacting to the air flow which is substantially directed against it caused by the vehicle's own velocity.

As can be seen in FIG. 12 (side view cut out region from FIG. 10 or FIG. 11) the area around the camera is shown. The nozzle's air stream outlet direction has an angle or partial vertical angle (32) downward relative to the camera which is installed laterally. This is substantially the same as the direction of impacting air caused by the vehicle's own velocity. As shown in FIG. 13, the air that flows from the nozzle 5 is directed in front of the camera and lens to deflect or blow particles away from the camera and lens. The air flow exits the nozzle 5 at a speed greater than the velocity of the vehicle and is deflected downward and back under the camera after it is discharged from the nozzle 5, such that the air stream flows in front of and around the camera and keeps rain or dirt or snow or the like from impacting the lens as the vehicle is traveling in a forward direction.

Figure 14:
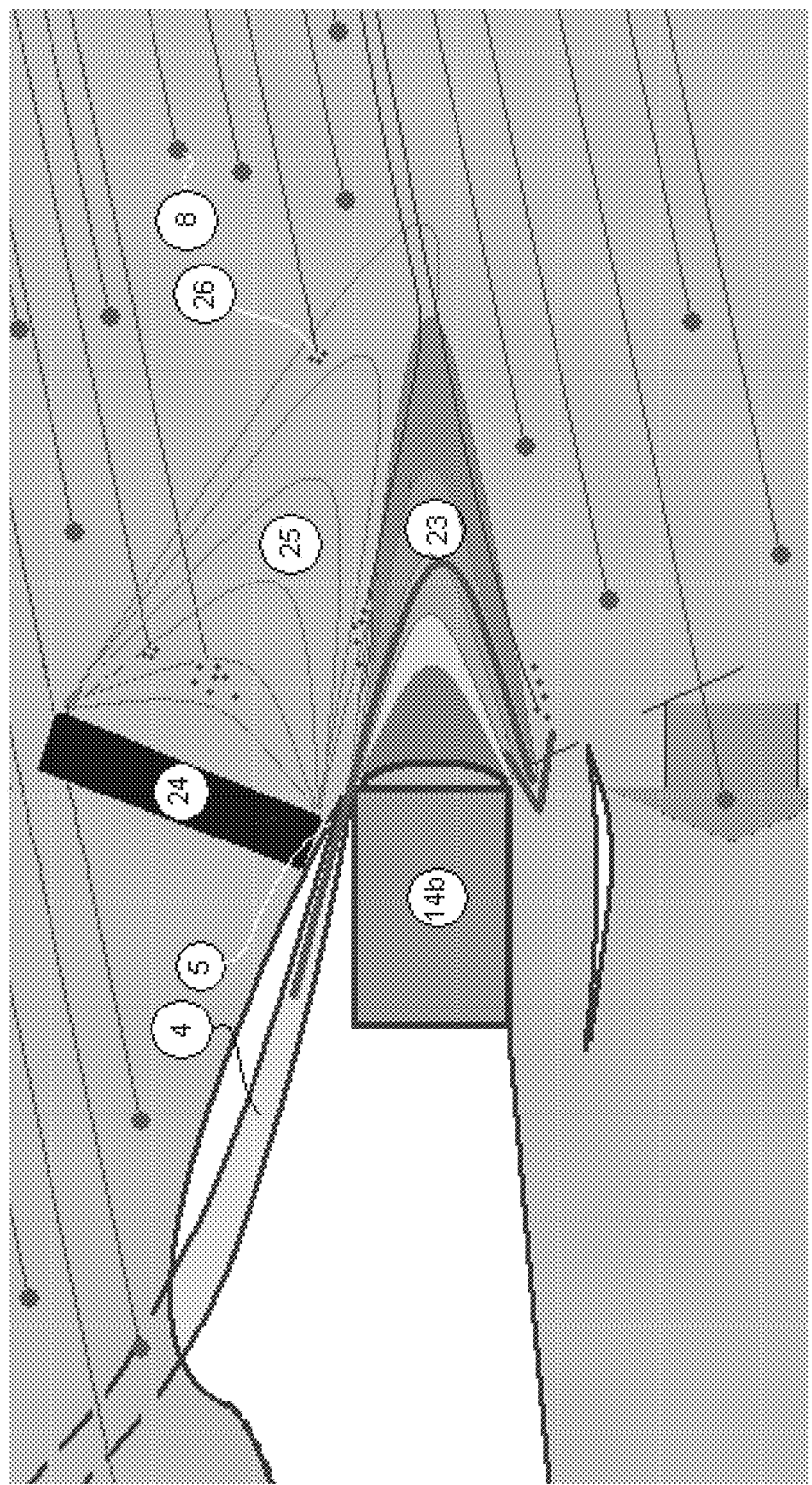
FIG. 14 is shown with an ultrasound emitter as another optional element of the system of the present invention.

Optionally, and as shown in FIG. 14, the system may comprise another optional element of the invention: heavy incoming water drops may be turned away from the camera lens more successful by diffusing them by a ultrasound emitter or generator 24 attached close to the region of the deflecting air stream, which enables that the diffused (means small and light) water drops are carried away by the air stream more easily.

Therefore, the present invention provides an air flow system that receives air as the vehicle travels along and funnels the received air to a smaller diameter passageway or nozzle to provide a higher velocity discharge air stream that is directed generally at and forwardly of a camera and lens of the vehicle. The higher velocity air stream deflects or blows particles from in front of the camera and lens so that the particles (such as snow, rain, dirt and/or the like) do not impact the lens of the camera to block or attenuate the field of view of the camera. The air flow system may function responsive to input air flow that is generated by the movement of the vehicle (whereby the exit air flow or air stream is at a substantially greater velocity than the input air flow and the vehicle), or an air flow generating device or means (such as a fan or the like) may be used to generate a desired input air flow. The air flow system may include a filter to filter out particles from the air stream, and/or the air flow system may include a means for limiting water or moisture in the discharge air flow or stream (such as by heating the inlet air flow or by providing deflectors or the like to deflect rain and moisture away from the inlet and into a water discharge port or the like).

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/116043; WO 2012/145313; WO 2012/145501; WO 2012/145818; WO 2012/145822; WO 2012/158167; WO 2012/075250; WO 2012/103193; WO 2012/116043; WO 2012/145501; WO 2012/145343; WO 2012/154919; WO 2013/019707; WO 2013/016409; WO 2012/145822; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; and/or WO 2013/043661, and/or PCT Application No. PCT/US2013/036701, filed Apr. 16, 2013; (PCT)) and/or U.S. patent applications Ser. No. 14/046,174, filed Oct. 4, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/851,378, filed Mar. 27, 2013; Ser. No. 61/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012 ; Ser. No. 13/653,577, filed Oct. 17, 2012; and/or Ser. No. 13/534,657, filed Jun. 27, 2012, and/or U.S. provisional applications, Ser. No. 61/886,883, filed Oct. 4, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,834, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/840,542; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/16,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/840,407, filed Apr. 10, 2013;

Ser. No. 61/808,930, filed Apr. 5, 2013; Ser. No. 61/807,050, filed Apr. 1, 2013; Ser. No. 61/806,674, filed Mar. 29, 2013; Ser. No. 61/806,673, filed Mar. 29, 2013; Ser. No. 61/793,592, filed Mar. 15, 2013; Ser. No. 61/793,614, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/756,832, filed Jan. 25, 2013; Ser. No. 61/754,804, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; and/or Ser. No. 61/718,382, filed Oct. 25, 2012, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication Nos. WO 2010/099416; WO 2011/028686 and/or WO 2013/016409, and/or U.S. patent application Ser. No. 12/508,840, filed Jul. 24, 2009, and published Jan. 28, 2010 as U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent applications Ser. No. 12/091,359, filed Apr. 24, 2008 and published Oct. 1, 2009 as U.S. Publication No. US-2009-0244361, and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; and/or 7,720,580, and/or U.S. patent application Ser. No. 10/534,632, filed May 11, 2005, now U.S. Pat. No. 7,965,336; and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. pat. applications Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308, 341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012-075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A The vision system for a vehicle, said vision system comprising:
   a camera comprising an imager and a lens, wherein said camera is disposed at an exterior portion of a vehicle and has a field of view exterior of the vehicle, and wherein said camera captures image data;
   a control comprising an image processor, wherein, responsive to said image processor processing image data captured by said camera, said control determines when there is debris at said lens of said camera;
   an air flow device operable to generate and direct air flow towards said lens of said camera to direct debris away from said lens of said camera;
   a heater device that heats the air flow so that heated air flow is directed towards said lens of said camera to direct debris away from said lens of said camera;
   wherein, responsive to determination of debris at said lens of said camera by processing by said image processor of captured image data, said control activates said air flow device to generate and direct air flow towards said lens of said camera;
   a moisture separator that separates water from the air flow, wherein the separated water is discharged from the air flow via a water discharge port that discharges the separated water away from said lens of said camera;
   wherein said camera comprises a front camera comprising an imager and a lens and disposed at a forward portion of the vehicle and having a field of view forwardly of the vehicle, and wherein said air flow device is operable to generate air flow and direct heated air flow towards said lens of said front camera to direct debris away from said lens of said front camera; and
   wherein an inlet port that receives air is disposed at a forward portion of the vehicle, and wherein said air flow device receives air from said inlet port, and wherein said moisture separator comprises baffles disposed at or near said inlet port of said vision system.

2. The vision system of claim 1, wherein side cameras each comprising an imager and a lens are disposed at respective side portions of the vehicle so as to have respective sideward fields of view, and wherein said air flow device is operable to generate and direct air flow towards said lenses of said side cameras to direct debris away from said lenses of said side cameras.

3. The vision system of claim 2, wherein, responsive to said image processor processing image data captured by at least one of said side cameras, said control determines when there is debris at said lens of said at least one of said side cameras, and wherein, responsive to determination of debris at said lens of said at least one of said side cameras, said control activates said air flow device to generate and direct air flow towards said lens of said at least one of said side cameras.

4. The vision system of claim 1, comprising a plurality of cameras having respective lenses and imagers, wherein said air flow device comprises a plurality of outlet ports, and wherein said outlet ports are configured to direct air flow towards said lenses to direct debris away from said lenses.

5. The vision system of claim 4, wherein said air flow device selectively generates air flow through one or more of a plurality of conduits for directing air towards a respective one of said plurality of cameras.

6. The vision system of claim 1, wherein said air flow device is operable to generate air flow at least when the vehicle is traveling at a speed below a threshold speed.

7. The vision system of claim 1, wherein said air flow device is operable to generate air flow at least responsive to a user input.

8. The vision system of claim 1, wherein said air flow device comprises a fan.

9. A vision system for a vehicle, said vision system comprising:
- a camera comprising an imager and a lens, wherein said camera is disposed at an exterior portion of a vehicle and has a field of view exterior of the vehicle, and wherein said camera captures image data;
- a control comprising an image processor, wherein, responsive to said image processor processing image data captured by said camera, said control determines when there is debris at said lens of said camera;
- an air flow device operable to generate and direct air flow towards said lens of said camera to direct debris away from said lens of said camera;
- a moisture separator that separates water from the air flow, wherein the separated water is discharged from the air flow via a water discharge port that discharges the separated water away from said lens of said camera;
- wherein an inlet port that receives air is disposed at a forward portion of the vehicle, wherein said air flow device receives air from said inlet port, and wherein said moisture separator comprises baffles disposed at or near said inlet port of said vision system;
- wherein, responsive to determination of debris at said lens of said camera by processing by said image processor of captured image data, said control activates said air flow device to generate and direct air flow towards said lens of said camera; and
- wherein said air flow device is operable to discharge a liquid at said lens of said camera to enhance cleaning of said lens of said camera.

10. The vision system of claim 9, wherein said camera comprises a front camera having a forward field of view.

11. The vision system of claim 9, comprising a plurality of cameras having respective lenses and imagers, wherein said air flow device comprises a plurality of outlet ports, and wherein said outlet ports are configured to direct air flow towards said lenses to direct debris away from said lenses.

12. The vision system of claim 11, wherein said air flow device selectively generates air flow through one or more of a plurality of conduits for directing air towards a lens of a respective one of said plurality of cameras.

13. The vision system of claim 12, wherein at least one of (i) said air flow device is operable to generate air flow at least when the vehicle is traveling at a speed below a threshold speed and (ii) said air flow device is operable to generate air flow at least responsive to a user input.

14. A vision system for a vehicle, said vision system comprising:
- a front camera comprising an imager and a lens, wherein said front camera is disposed at an exterior front portion of a vehicle and has a field of view exterior and forward of the vehicle;
- a first side camera and a second side camera, each comprising an imager and a lens, wherein said first and second side cameras are disposed at respective side portions of the vehicle so as to have a respective sideward field of view;
- a control comprising an image processor, wherein, responsive to said image processor processing image data captured by said camera, said control determines when there is debris at said lens of at least one of said cameras;
- an air flow device operable to receive air at an inlet port and to generate and direct air flow towards said lenses to direct debris away from said lenses;
- a moisture separator that separates water from the air received at said inlet port, wherein the separated water is discharged via a water discharge port that discharges the separated water away from said lens of said camera;
- a heater device operable to heat the air flow after water is separated from the air so that heated air flow is directed towards said lenses to direct debris away from said lenses; and
- wherein, responsive to determination of debris at said lens of one of said cameras by processing by said image processor of captured image data, said control activates said air flow device to generate and direct air flow towards said lens of said one of said cameras.

15. The vision system of claim 14, comprising a rear camera comprising an imager and a lens and disposed at a rearward portion of the vehicle so as to have a field of view rearward of the vehicle, and wherein said air flow device is operable to generate and direct air flow towards said lens of said rear camera to direct debris away from said lens of said rear camera.

16. The vision system of claim 15, wherein said air flow device is operable to discharge a liquid at said lens of said one of said cameras to enhance cleaning of said lens.

17. The vision system of claim 14, wherein said air flow device comprises a plurality of conduits and outlet ports, and wherein said conduits and outlet ports are configured to direct air flow towards said lenses of said cameras to direct debris away from said lenses.

18. The vision system of claim 14, comprising an ultrasound emitter disposed at or near said lens of at least one of said cameras to diffuse water droplets remaining in the air flow from approaching said lens of said at least one of said cameras.

* * * * *

UNITED STATES PATENT AND TRADEMARK OFFICE
CERTIFICATE OF CORRECTION

PATENT NO. : 9,707,896 B2  
APPLICATION NO. : 14/052945  
DATED : July 18, 2017  
INVENTOR(S) : Ruediger Boegel et al.

Page 1 of 1

It is certified that error appears in the above-identified patent and that said Letters Patent is hereby corrected as shown below:

In the Claims

Column 12
Line 12, Claim 1, "A The vision" should be --A vision--

Signed and Sealed this
Thirteenth Day of November, 2018

Andrei Iancu
*Director of the United States Patent and Trademark Office*